United States Patent
Willner et al.

(10) Patent No.: US 10,750,257 B2
(45) Date of Patent: Aug. 18, 2020

(54) DATA ENCODING AND CHANNEL HOPPING USING ORBITAL ANGULAR MOMENTUM MODES

(71) Applicant: University of Southern California, Los Angeles, CA (US)

(72) Inventors: Alan E. Willner, Los Angeles, CA (US); Yongxiong Ren, Los Angeles, CA (US); Guodong Xie, Los Angeles, CA (US); Asher J. Willner, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 0 days.

(21) Appl. No.: 15/838,120

(22) Filed: Dec. 11, 2017

(65) Prior Publication Data

US 2018/0167703 A1     Jun. 14, 2018

Related U.S. Application Data

(60) Provisional application No. 62/432,484, filed on Dec. 9, 2016.

(51) Int. Cl.
| | |
|---|---|
| *H04J 14/00* | (2006.01) |
| *H04Q 11/00* | (2006.01) |
| *H04B 10/556* | (2013.01) |
| *H04B 10/11* | (2013.01) |
| *H04J 14/04* | (2006.01) |

(52) U.S. Cl.
CPC ......... *H04Q 11/0062* (2013.01); *H04B 10/11* (2013.01); *H04B 10/556* (2013.01); *H04J 14/04* (2013.01); *H04Q 11/00* (2013.01); *H04Q 11/0003* (2013.01); *H04Q 2213/1301* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0259914 | A1* | 11/2005 | Padgett | H01Q 5/22 385/16 |
| 2013/0223351 | A1* | 8/2013 | Flammer, III | H04B 1/713 370/329 |
| 2013/0235744 | A1* | 9/2013 | Chen | H04L 47/82 370/252 |
| 2015/0200704 | A1* | 7/2015 | Graceffo | H04B 1/713 375/141 |

(Continued)

*Primary Examiner* — David C Payne
*Assistant Examiner* — Pranesh K Barua
(74) *Attorney, Agent, or Firm* — Snell & Wilmer LLP

(57) ABSTRACT

Methods, systems, and devices for data encoding and channel hopping. The system includes a signal source for providing a signal. The system includes an optical switch having an input port and multiple output paths. The optical switch is configured to receive, at the input port, the signal. The optical switch is configured to route the signal to an output path of the multiple output paths. The system includes a mode converter that is connected to the optical switch and configured to select an orbital angular momentum (OAM) mode. The mode converter is configured to encode or channel hop the signal using the OAM mode and combine the signal from each output path. The system includes a transmitter configured to propagate the signal.

18 Claims, 10 Drawing Sheets

(56) References Cited

U.S. PATENT DOCUMENTS

| | | | | |
|---|---|---|---|---|
| 2015/0349910 | A1* | 12/2015 | Huang | H04J 14/00 |
| | | | | 398/44 |
| 2016/0094305 | A1* | 3/2016 | Yamashita | H04J 14/0221 |
| | | | | 398/34 |
| 2016/0198954 | A1* | 7/2016 | Wang | A61B 5/0095 |
| | | | | 600/407 |
| 2016/0202283 | A1* | 7/2016 | Wang | B64D 45/00 |
| | | | | 356/28 |
| 2016/0212510 | A1* | 7/2016 | Bogoni | H04J 14/04 |
| 2016/0254897 | A1* | 9/2016 | Berretta | H04L 5/02 |
| | | | | 375/267 |
| 2016/0277173 | A1* | 9/2016 | Dutronc | H04L 5/02 |
| 2017/0012732 | A1* | 1/2017 | Kowalevicz | H01Q 21/20 |
| 2017/0026095 | A1* | 1/2017 | Ashrafi | H04B 7/0456 |
| 2017/0126460 | A1* | 5/2017 | Dutronc | H04L 5/0048 |
| 2017/0187442 | A1* | 6/2017 | Luddy | H04L 25/03898 |
| 2017/0201324 | A1* | 7/2017 | Wang | H04B 10/5161 |
| 2017/0353265 | A1* | 12/2017 | Mansouri Rad | H04B 10/2581 |
| 2019/0020434 | A1* | 1/2019 | Adachi | H04J 11/00 |

* cited by examiner

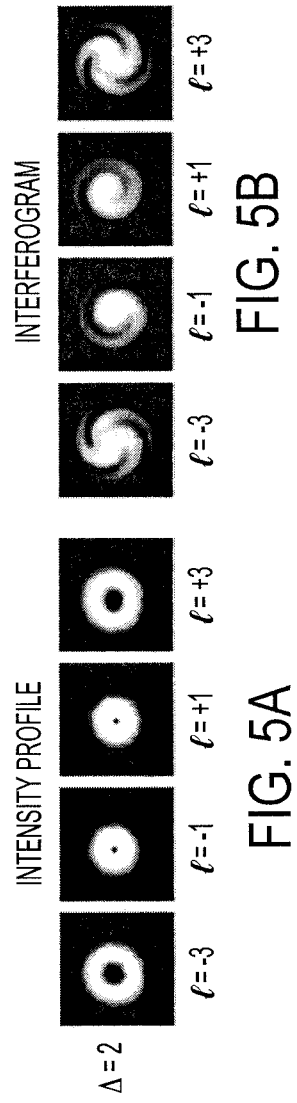

DATA ENCODING AND CHANNEL HOPPING USING ORBITAL ANGULAR MOMENTUM MODES

CROSS-REFERENCE TO RELATED APPLICATIONS

This application claims priority to and the benefit of U.S. Provisional Patent Application No. 62/432,484 titled "DATA HOPPING AND CHANNEL HOPPING USING ORBITAL ANGULAR MOMENTUM MODES," filed on Dec. 9, 2016, and the entirety of which is hereby incorporated by reference herein.

BACKGROUND

1. Field

This specification relates to a system, device and/or a method for data encoding and channel hopping.

2. Description of the Related Art

Free-space optical communication plays a significant role in line-of-sight links. The data in these links can be encoded on the amplitude, phase or temporal position of the optical wave. For example, typical systems may use on-off keying to represent the presence or absence of a carrier wave. In certain environments, more information may be desired for a given amount of optical energy, which requires more degrees-of-freedom for the wave to occupy. This provides for a higher energy efficiency for a given capacity.

Traditionally, free-space optical links have used only a single beam. The use of a single beam allows little opportunity for a wave to occupy more than one spatial location, and thus, does not allow for the use of the spatial domain for encoding. Recently, space- and mode-multiplexing has been demonstrated to transmit multiple data-carrying free-space beams. The spatially overlapping mode may be orthogonal to other modes and carry a unique amount of orbital-angular momentum (OAM). The performance of these OAM-based data encoding schemes have been limited in performance to kHz data rates and have been limited in the amount of information that is conveyed within a set amount of energy.

Accordingly, there is a need for a system and a method to improve or increase the amount of information that is conveyed within the set amount of energy and improve or increase the data rates for the communications so that more information is conveyed for the set of energy to improve and increase the overall data transfer.

SUMMARY

In general, one aspect of the subject matter described in this specification is embodied in a system for data encoding or channel hopping. The system includes a signal source for providing a signal. The system includes an optical switch having an input port and multiple output paths. The optical switch is configured to receive, at the input port, the signal. The optical switch is configured to route the signal to an output path of the multiple output paths. The system includes a mode converter. The mode converter is connected to the optical switch and configured to select an orbital angular momentum (OAM) mode. The mode converter is configured to encode or channel hop the signal using the OAM mode and combine the signal from each output path. The system includes a transmitter configured to propagate the signal.

These and other embodiments may optionally include one or more of the following features. The signal may be a beam of continuous wave (CW) laser light or a quadrature phase-shift keying (QPSK) signal. The signal source may be configured to transmit the beam of CW laser light to the optical switch when encoding data or transmit the QPSK signal to the optical switch when channel hopping.

The mode converter may include a first spatial light modulator (SLM) having a spiral phase hologram that is configured to convert or set the signal into a single OAM mode. The mode converter may include a beam splitter that is configured to combine the signal from each output path.

The system may include a free-space collimator that narrows the beam of CW laser light from the output path. The system may include a receiver that is configured to receive the combined signal. The system may include a second SLM that is configured to decouple the combined signal and convert each signal of the combined signal into a Gaussian beam. The system may include a single-mode optical fiber that is configured to send the Gaussian beam to a processor for signal detection and data recovery. The optical switch may be formed from multiple optical switches that are cascaded together. The OAM more for each signal of each output path may be different.

In another aspect, the subject matter is embodied in a method for data encoding or channel hopping. The method includes receiving, by a data modulator, a signal being a beam of CW laser light, when data encoding, or a QPSK signal, when channel hopping. The method includes converting the signal using a respective OAM mode of multiple OAM modes. The method includes transmitting or propagating the converted signal.

In another aspect, the subject matter is embodied in a system for data encoding or channel hopping. The system includes a signal source for providing a signal. The system includes an optical switch configured to receive the signal. The system includes a first SLM that has a spiral phase hologram that is configured to convert or set the signal into an OAM mode. The system includes multiple beam splitters that are connected to the first SLM. The multiple beam splitters are configured to combine the signal and propagate the combined signal over-the-air. The system includes a receiver that is configured to receive the combined signal and a second SLM to decouple the combined signal.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

FIGS. 5A-5B shows the intensity profiles and interferograms, respectively, of four different OAM beams with a mode spacing of Δ=2 according to an aspect of the invention.

DETAILED DESCRIPTION

Disclosed herein are systems, devices and methods for data encoding and/or channel hopping using Orbital-Angular-Momentum (OAM) modes. A data encoding and/or channel hopping system (hereinafter, "encoding and hopping system") using OAM modes to encode data and/or channel hop allows a beam to occupy one of many modes. With additional modes, the beam provides additional possible states and additional capacity to convey information while using the same amount of energy to communicate the information. An encoding and hopping system that uses OAM modes is able to encode data across several modes, which is accomplished using a fast switch. This increases the speed and efficiency of data encoding. The encoding and hopping system also achieves low bit error rates at high data rate speeds that are orders-of-magnitude faster than previous communication data rates achieved.

The OAM modes provide a large number of discrete states, which may be used for data encoding in the spatial domain. The large number of discrete states allow the encoding and hopping system to encode a higher amount of data for a fixed amount of optical power since there are a greater number of possible states for the optical wave to occupy in a single symbol. This increases the amount of information per unit time for a fixed amount of optical power. Since there are more degrees-of-freedom, the optical wave can occupy and be encoded with more information and at a higher energy efficiency for a given capacity for either classical or quantum communication.

Other benefits and advantages include the encoding and hopping system utilizing space-division-multiplexing (SDM) which dramatically increases system capacity. The encoding and hopping system multiplexes multiple independent data-carrying spatial channels and de-multiplexes the combined signal at the receiver to enhance system performance. Additionally, the use of OAM modes to perform data encoding and/or channel hopping provides additional security due to the availability of multiple states or values that hold the data signal.

Figure 1A:
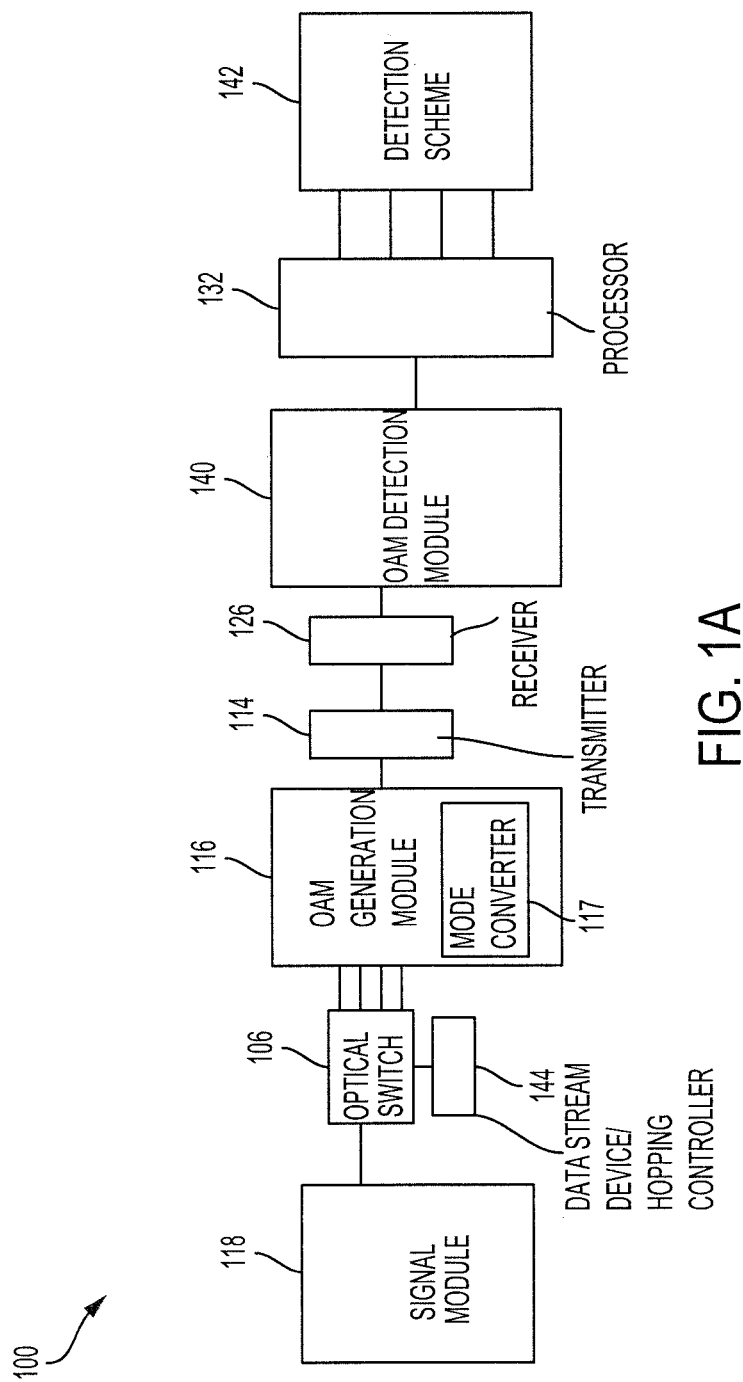
FIG. 1A shows an example data encoding and channel hopping system that utilizes Orbital-Angular Momentum (OAM) modes to data encode and/or channel hop according to an aspect of the invention.
Figure 1B:
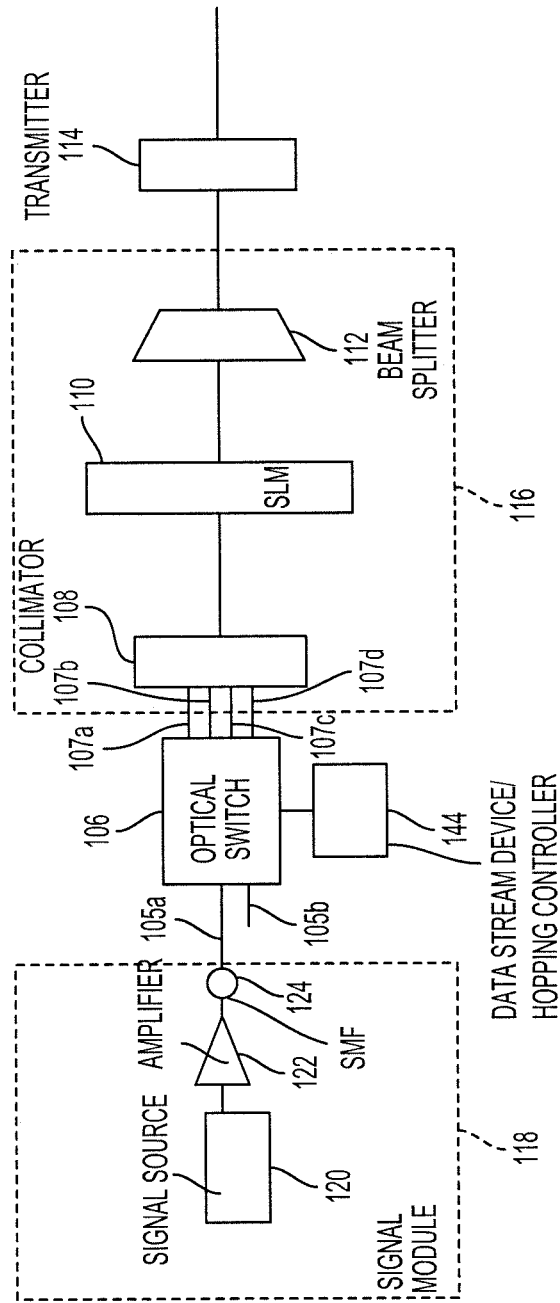
FIG. 1B shows a transmitter of the data encoding and channel hopping system of FIG. 1A according to an aspect of the invention.
Figure 1C:
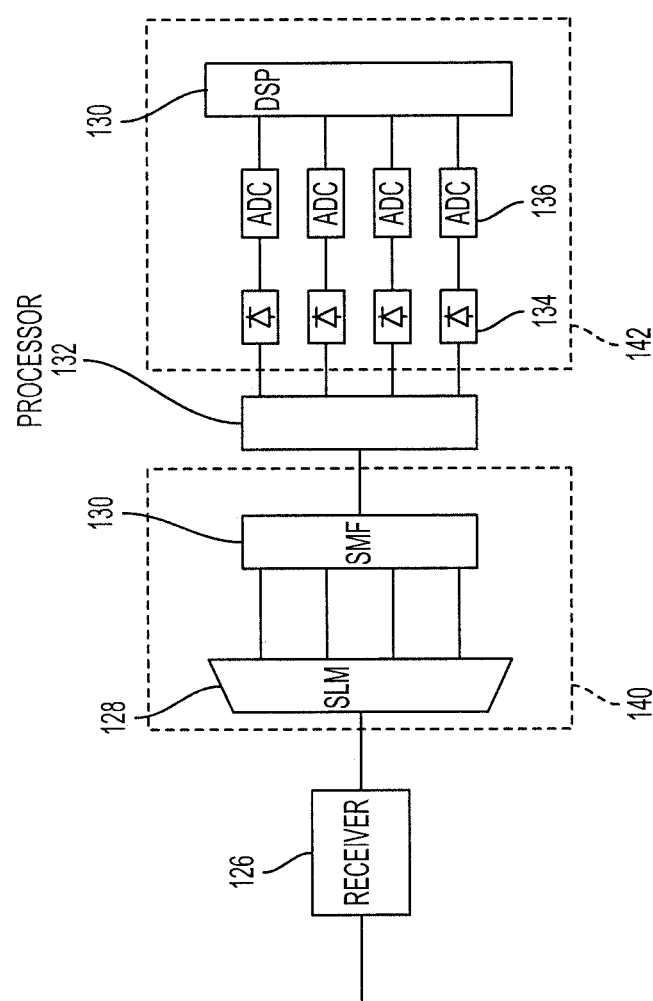
FIG. 1C shows a receiver of the data encoding and channel hopping system of FIG. 1A according to an aspect of the invention.

FIG. 1A shows an encoding and hopping system 100 that uses OAM modes to data encode and/or channel hop. The encoding and hopping system 100 includes a transmitting device 102 and a receiving device 104. The encoding and hopping system 100 may include a data encoding and detection scheme 142.

The encoding and hopping system 100 includes a transmitting device 102. The transmitting device 102 includes an optical switch 106, an OAM generation module 116 and a transmitter 114. The encoding and hopping system 100 may include a data stream device, e.g., a pseudo-random binary sequence (PRBS) sequencer, and/or a hopping controller 144. The OAM generation module 116 may include a collimator 108, a programmable spatial light modulator (SLM) 110 and/or a beam splitter 112. The transmitting device 102 may include a signal module 118. The OAM generation module 116 may have a mode converter 117 that combines the functions of the collimator 108, SLM 110 and/or beam splitter 112.

The transmitting device 102 may include a signal module 118. The signal module 118 includes a signal source 120 that provides a signal, such as a continuous wave (CW) laser or a data signal, an amplifier 122 and/or a single mode fiber (SMF). The data signal may be a Phase-Shift Keying (PSK) signal that may have any number of phases, such as a Quadrature Phase-Shift Keying (QPSK) signal. The signal source 120 may transmit a single signal to be encoded or channel hopped using a single OAM mode. In some implementations, the signal source 120 may transmit multiple signals to be channel hopped using multiple OAM modes. The amplifier 122 may be an Erbium-Doped Fiber Amplifier (EDFA). The EDFA is a device that amplifies the optical signal. The signal module 118 may have an SMF 124 that carries the optical signal to the optical switch 106. The SMF 124 may delay and/or de-correlate one of the multiple signals if there are multiple signals for channel hopping before providing the signals to the optical switch 106.

The transmitting device 102 includes the optical switch 106. The optical switch 106 may have multiple inputs ports and/or multiple output paths. For example, the optical switch 106 may have 2 input ports 105a-b and 4 output paths 107a-d to the OAM generation module 116. The optical switch 106 may operate at a switching rate up to 10 GHz. The multiple input ports are each configured to receive the signal and route the signal to the OAM generation module 116 through the multiple output paths. The optical switch 106 may be formed using one or more optical switches that are cascaded. For example, a 2×4 optical switch may be formed by cascading a 1×2 optical switch and a 2×2 optical switch.

The transmitting device 102 may include a data stream device, such as a PRBS sequencer, or a hopping controller 144. The data stream device selects the OAM mode on which the signal uses to perform data encoding and/or channel hopping. The data stream device and/or hopping controller 144 selects the OAM mode and switches among the different OAM modes within the set of OAM modes.

The transmitting device 102 includes an OAM generation module 116. The OAM generation module 116 may include a collimator 108, one or more spatial light modulators (SLM) 110 and a beam splitter 112. The OAM generation module 116 receives the signal from at least one of the output paths of the optical switch 106. The OAM generation module 116 employs OAM modes to perform data encoding and/or channel hopping of the signal.

For example, a collimator 108 may narrow the signal outputted from at least one of the output paths of the optical switch 106. The collimator 108 may be a free-space collimator with a diameter of 3 mm, which launches the signal onto one or more SLMs 110. The one or more SLMs 110 may convert the signal in each output path into a Gaussian-like beam. A combiner, such as a beam splitter 112, couples each beam outputted by the SLMs 110 for transmission to the receiving device for detection and data recovery.

The transmitting device 102 includes a transmitter 114. The transmitter 114 transmits or sends the combined signal to the receiving device 104 for detection and data recovery. The transmission is sent over-the-air and is secured by the channel hopping and/or data encoding using the OAM modes.

The encoding and hopping system 100 includes a receiving device 104. The receiving device 104 includes a receiver 126, an OAM detection module 140, and a processor 132. The OAM detection module 140 may include a SLM 128 and a SMF 130.

The receiving device 104 includes the receiver 126 that receives the combined signal from the transmitter 114. The receiver 126 provides the received signal to the OAM detection module 140 for demodulation.

The receiving device 104 has an OAM detection module 140. The OAM detection module 140 detects and extracts the modulated signal for each OAM value. The OAM detection module 140 separates the modulated signal for each OAM value and converts the modulated signal into a Gaussian-like beam for each OAM value. For example, the SLM 128 may separate the modulated signal from the combined signal and convert the modulated signal into the Gaussian-like beam for each OAM value. The Gaussian-like beams are coupled, using a SMF 130, for data detection and recovery, by a processor 132, for example.

The receiving device 104 includes a processor 132. The processor 132 performs the detection and data recovery of the signal. The processor 132 identifies the transmitted OAM mode for each symbol period in each beam and recovers the bit information using a mapping relationship between the bit information and OAM mode values. For channel hopping, the data stream of each channel may be recovered sequentially. The processor 132 may record the channels for each beam for offline digital signal processing.

The encoding and hopping system 100 may include a data encoding and detection scheme 142. The encoding and hopping system 100 may use the data encoding and detection scheme 142 for offline processing of the recovered data from the beams. The data encoding and detection scheme 142 may include one or more photodiodes 134, one or more analog-to-digital converters (ADC) 136 and a digital signal processor (DSP) 138. The one or more photodiodes 134 convert the light to an electrical current, which the ADC 136 converts to a digital signal that the DSP 138 processes. In some implementations, the encoded data and/or channel hopped data is provided to an electronic device that displays or otherwise utilizes or interprets the data.

Figure 2:
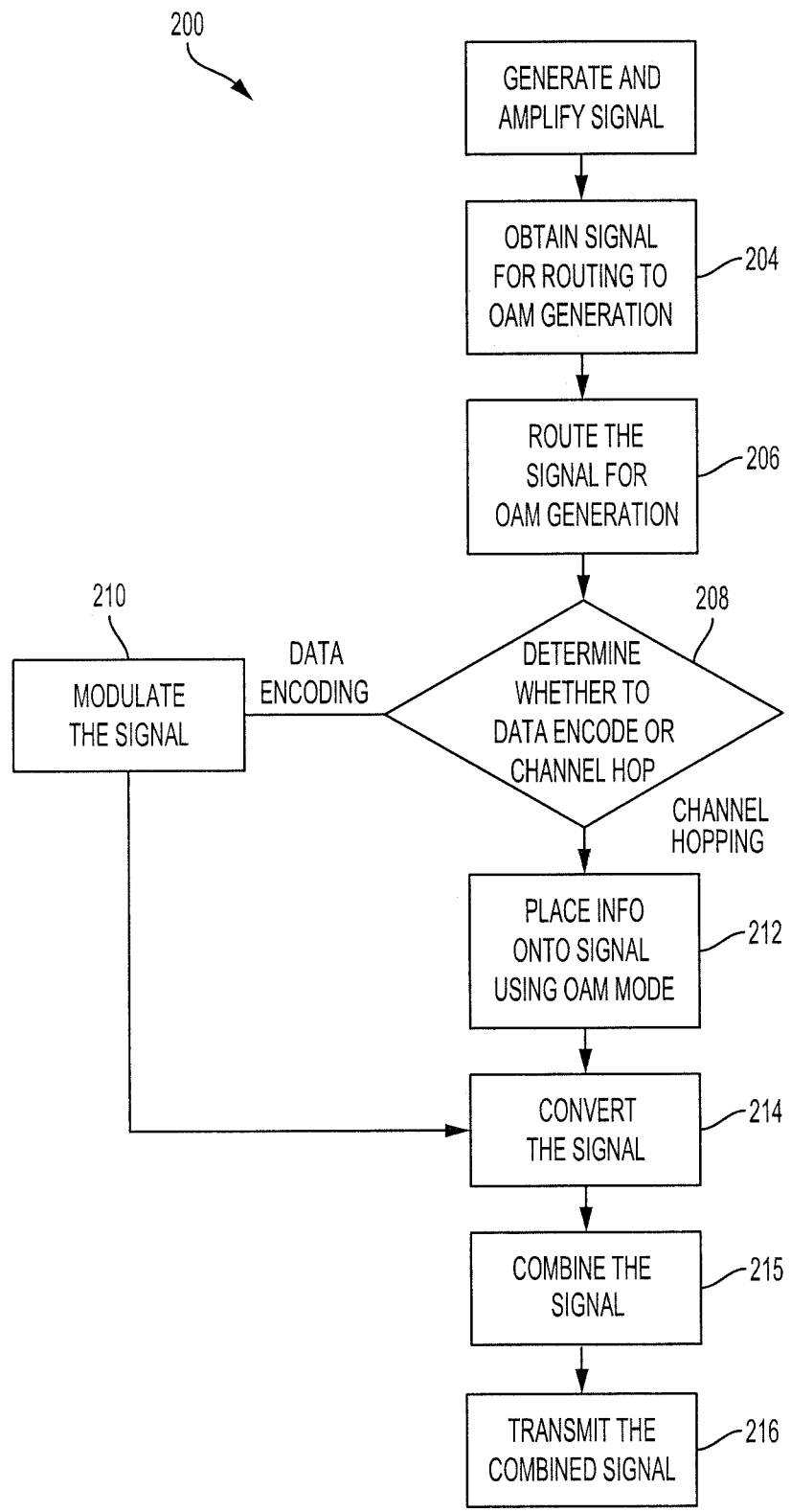
FIG. 2 is an example process of transmitting a data encoded and/or a channel hopped signal using the data encoding and hopping system of FIG. 1 according to an aspect of the invention.

FIG. 2 is a flow diagram of a process 200 for transmitting a data encoded or channel hopped signal. The encoding and hopping system 100, for example, may implement the process 200 to perform data encoding and/or channel hopping using OAM modes. By performing data encoding and/or channel hopping using OAM modes, the encoding and hopping system 100 enhances the amount of information that may be transmitted per amount of energy and enhance the security of the transmission.

The encoding and hopping system 100 may generate and amplify a signal prior to OAM generation (202). The signal may be a CW light or a PSK signal, such as a QPSK signal. The encoding and hopping system 100 may generate the signal using a signal source, such as a CW laser or a transmitter, and amplify the signal using an amplifier.

When performing channel hopping, the signal source may generate multiple signals to be channel hopped. In some implementations, the encoding and hopping system 100 may split the signal into multiple signals, e.g., when performing experimentation. The encoding and hopping system 100 may delay one or more of the multiple signals to synchronize the multiple signals prior to OAM generation and/or for de-correlation.

An optical switch 106 of the encoding and hopping system 100 obtains the signal from the signal source (204). The optical switch 106 may have multiple input ports. When data encoding and/or channel hopping, the optical switch 106 receives the signal at one of the input ports. When channel hopping, the optical switch 106 may receive another signal at another input port.

Figure 3A:
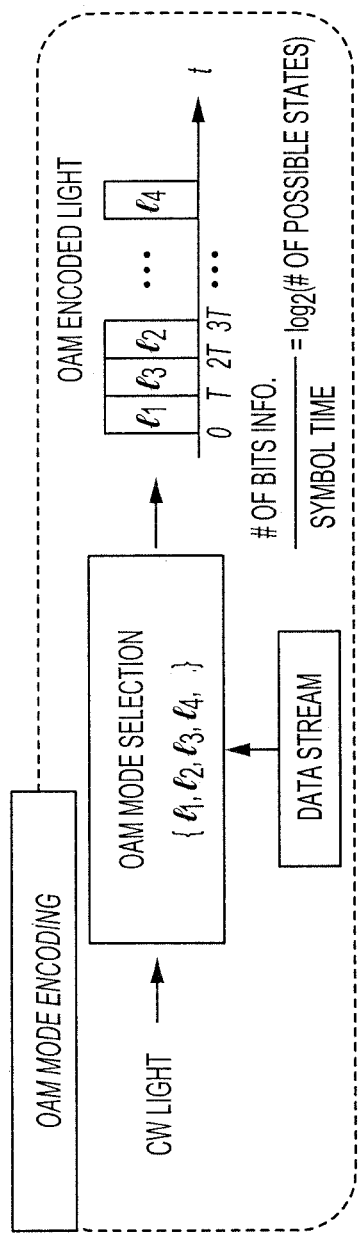
FIG. 3A shows the data encoding and channel hopping system of FIG. 1A performing data encoding using OAM modes according to an aspect of the invention.

The optical switch 106 routes the one or more signals along one or more output paths for OAM generation (206). The optical switch 106 may provide the one or more signals to the OAM generation module for data encoding and/or channel hopping in response to receiving the signal. For data encoding, the data stream device switches the OAM mode so that the signal is loaded onto a single OAM mode for a single symbol time period, as shown in FIG. 3A, for example. The data stream device then rotates, switches or selects another OAM mode so that the signal is loaded onto another OAM mode for a subsequent symbol time period. Thus, the bit information is mapped or loaded onto different OAM modes in different symbol time periods. For channel hopping, the hopping controller may select one or more OAM modes to use when loading the bit information onto the phase and amplitude of one or more signals.

The encoding and hopping system 100 may determine whether to perform data encoding or channel hopping (208). The encoding and hopping system 100 may determine the mode based on the type of signal that the optical switch 106 receives. For example, the optical switch 106 may detect or identify that the signal is a CW light and set the OAM generation module 116 to perform data encoding or the optical switch 106 may detect or identify that the signal as a data signal, such as a PSK signal, and set the OAM generation module 116 to perform channel hopping. In some implementations, the encoding and hopping system 100 may determine whether to perform data encoding and/or channel hopping based on a user input or configuration that identifies whether the encoding and channel hopping system 100 is to perform data encoding or channel hopping.

The OAM generation module 116 receives the signal from the optical switch 106. For data encoding, the encoding and hopping system 100 modulates the signal using OAM modes (210). The encoding and hopping system 100 encodes bits of information on the signal and converts the signal into one of the modes of the OAM modes, N, e.g., in the set of OAM modes $\{l_1, l_2, l_3, \text{and } l_4\}$ for each symbol period, T, as shown in FIG. 3A, for example. The encoding and hopping system 100 switches or selects among the different OAM modes and loads the bit information onto different OAM modes for each symbol period using the data stream device. The amount of bit information that is loaded may be represented by the following: Number of bits information/Symbol Time=$\log_2$ (Number of Possible States).

Figure 3B:
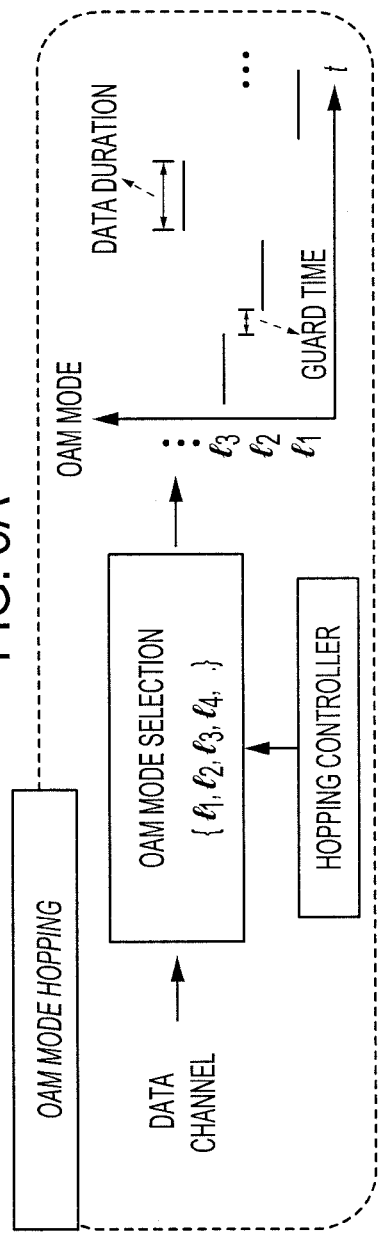
FIG. 3B shows the data encoding and channel hopping system of FIG. 1A performing channel hopping using OAM modes according to an aspect of the invention.

For channel hopping, the encoding and hopping system 100 uses the hopping controller 144 to select and use an OAM mode to place the bit information onto the signal, such as the QPSK signal, as shown in FIG. 3B, for example (212). This enhances the security of the communication. The encoding and hopping system 100 may use another OAM mode and place other bit information on a second signal. The OAM value and time duration depends on a controller signal that is sent by the hopping controller 144. The encoding and hopping system 100 includes a guard time during the channel hopping. The encoding and hopping system 100 places the bit information onto the phase and amplitude of the signal and uses the different OAM modes to further secure the transmission of the signal since the OAM mode switches as the bit information is loaded onto the signal.

The encoding and hopping system 100 may narrow the signal, e.g., using a free-space collimator, and launch the signal onto an SLM to convert the signal using the OAM mode. The encoding and hopping system 100 may use an SLM or mode converter to convert the signal using the OAM mode (214). Each SLM may be loaded with a specific spiral phase hologram which converts the signal into a desired OAM value in the set of OAM modes, e.g., in the set of OAM modes $\{l_1, l_2, l_3, \text{and } l_4\}$. FIG. 5A shows the intensity profiles and FIG. 5B shows the interferograms of the different OAM beams l=−3, −1, +1, and +3 with a mode space of Δ=2 in an experimental setup where the optical switch operates at 10 GHz. The interferograms are obtained from interfering OAM beams with an expanded Gaussian beam. The rotating arms in the interferograms confirm the OAM value of each beam.

The encoding and hopping system 100 may combine the one or more signals on the different output paths using a combiner, such as a beam splitter 112 or other mode converter/combiner (215). The combiner provides the combined signal to the transmitter 114. That is, the combiner sequences all the beams from all the different channels across all the symbol time periods when data encoding and/or overlaps and forms a single signal from the one or more signals when channel hopping. The encoding and hopping system 100 transmits the combined signal across free-space (216).

Figure 4:
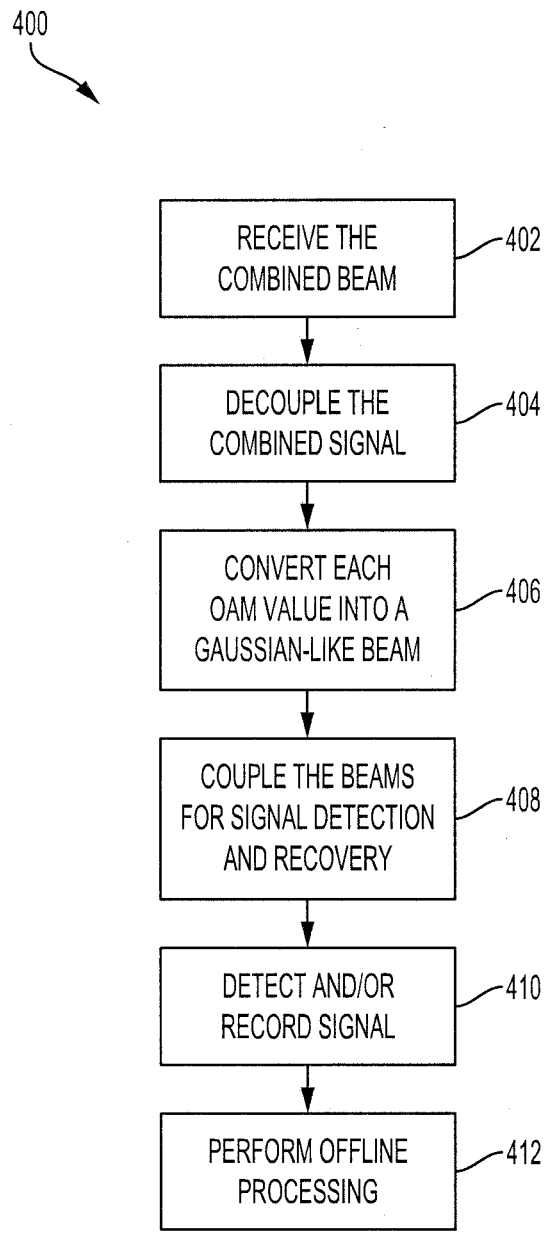
FIG. 4 is an example process of receiving a data encoded signal and/or a channel hopped signal using the encoding and hopping system of FIG. 1 according to an aspect of the invention.

FIG. 4 is a flow diagram of a process 400 for receiving a data encoded or channel hopped signal. The encoding and hopping system 100, for example, may implement the process 400 to perform data encoding and/or channel hopping using OAM modes.

The encoding and hopping system 100 receives a combined signal that has been data encoded and/or channel hopped (402). The combined signal may have multiple OAM values that are decoupled. The receiver 126 provides the combined signal to an OAM detection module 140 where the combined signal is demodulated or converted into a Gaussian-like beam.

The encoding and hopping system 100 decouples, extracts or separates the multiple OAM values from the combined signal at the detection module 140 (404). The encoding and hopping system 100 may decouple, extract or separate the multiple OAM values using the SLM 128. For channel hopping, the encoding and hopping system 100 may demultiplex the combined signal into separate signals. The encoding and hopping system 100 converts each of the multiple OAM values into a Gaussian-like beam using the SLM, for example (406).

The encoding and hopping system 100 couples the Gaussian-like beams, for example, using an SMF 130 to provide to a processor 132 to perform signal detection and recovery (408). During signal detection and recovery, the encoding and hopping system 100 detects and/or records the signal for offline processing (410). The information encoded and/or obscured by the channel hopping may be used by another electronic device or analyzed. The processor 132 identifies the transmitted OAM mode for each symbol period. The processor 132 calculates the power of each of the extracted or decoupled beams and determines the bit information using a mapping relationship to identify the transmitted OAM for each symbol period. For channel hopping, the encoding and hopping system 100 may use a PSK coherent receiver, such as a 100 Gbit/s QPSK coherent receiver, to recover the data stream for each beam sequentially.

The encoding and hopping system 100 may perform offline processing, such as offline digital signal processing, to recover the data from the beams (412). The encoding and hopping system 100 may convert the signal from an analog to a digital signal to input into a digital signal processor to analyze. The encoding and hopping system 100 may use one or more photodiodes to convert the light into an electrical current and use an analog-to-digital (ADC) converter to convert the electrical current into a digital signal that is provided to a digital signal processor for analysis and/or a device for use.

Figure 6A:
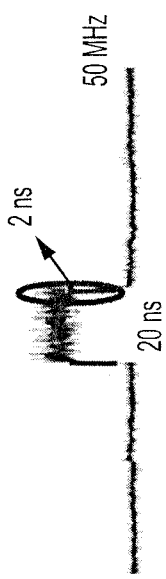
FIGS. 6A-6D show a symbol period of a received signal for a channel of an OAM mode at different hopping rates according to an aspect of the invention.
Figure 6B:
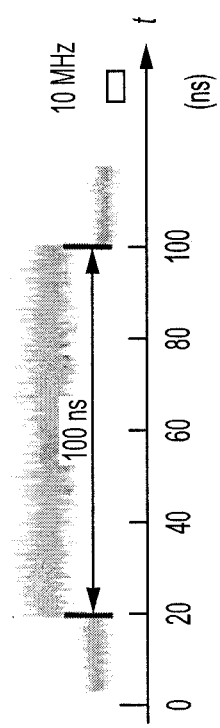
Figure 6C:
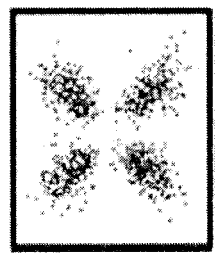
Figure 6D:
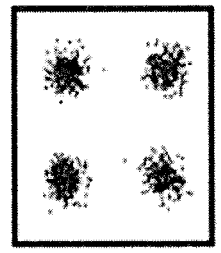

Offline processing may include analyzing waveforms within the channels and measuring bit error rate at different mode spacing and frequencies. For example, in an experimental setup demonstrating channel hopping, where the signal source is a 100 Gbit/s QPSK signal and the signal hops between four OAM modes, FIGS. 6A-6B show a period of the waveform received for the OAM value $l_3$=+1 at hopping rates of 10 and 50 MHz, respectively, when using the mode set $\{l_1$=−3, $l_2$=−1, $l_3$=+1, and $l_4$=+3$\}$. FIGS. 6C-6D show the recovered constellations of the signal during the effective data period and the switching transition time at the 50 MHz hopping rate, respectively. The QPSK constellation in FIG. 6D is blurred in comparison to the QPSK constellation in FIG. 6C due to power leakage or and/or crosstalk when hopping to another mode. The power leakage among the four OAM values is further shown in Table 1 below:

TABLE 1

Power Transfer between 4 OAM channels under mode spacing of Δ = 2.

| | dBm | l = +1 Ch 1 | l = +3 Ch 2 | l = −3 Ch 3 | l = −1 Ch 4 |
|---|---|---|---|---|---|
| l = ±1 and ±3 with mode spacing Δ = 2 | Ch 1 | −7.19 | −31.8 | −39.6 | −26.9 |
| | Ch 2 | −25.3 | −7.0 | −52.9 | −37.1 |
| | Ch 3 | −44.5 | −45.3 | −7.5 | −28.2 |
| | Ch 4 | −35.4 | −26.4 | −31.0 | −7.51 |

Figure 7:
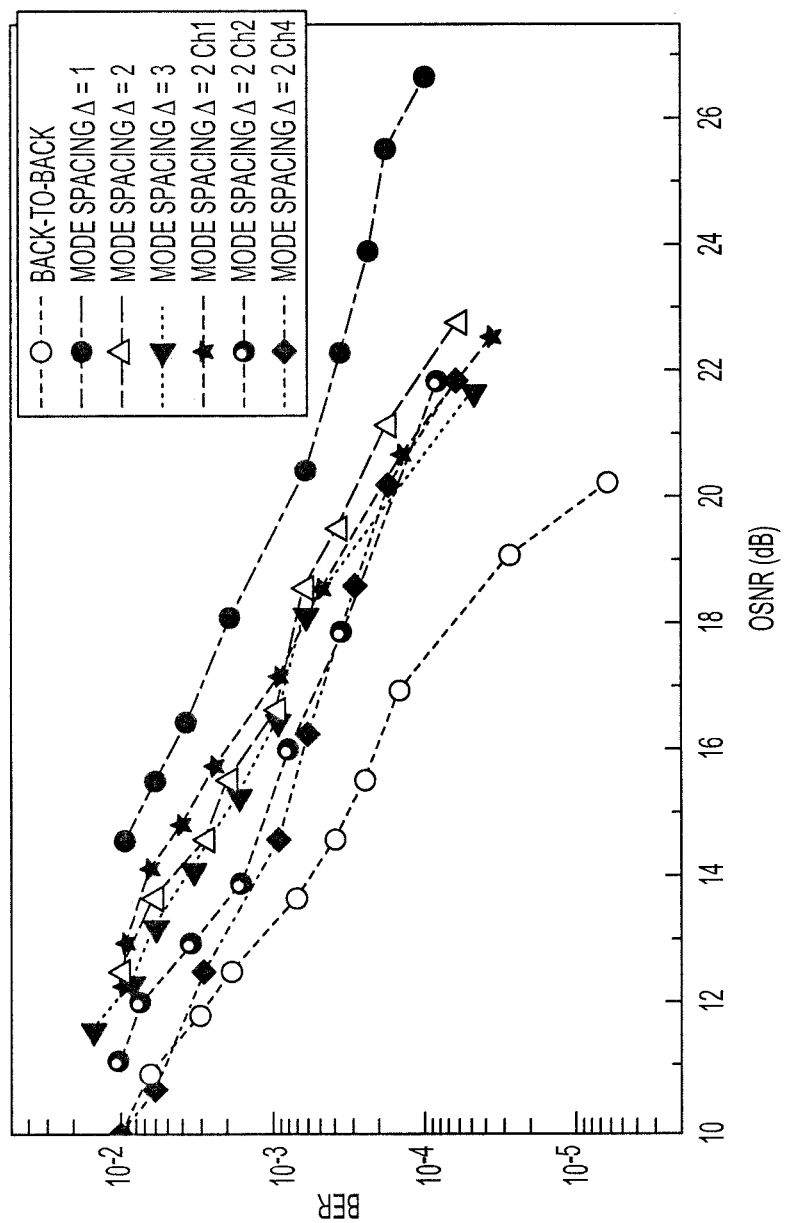
FIG. 7 shows a graphical illustration of the bit error rate for an OAM value when using mode sets with different mode spacing according to an aspect of the invention.
Figure 8:
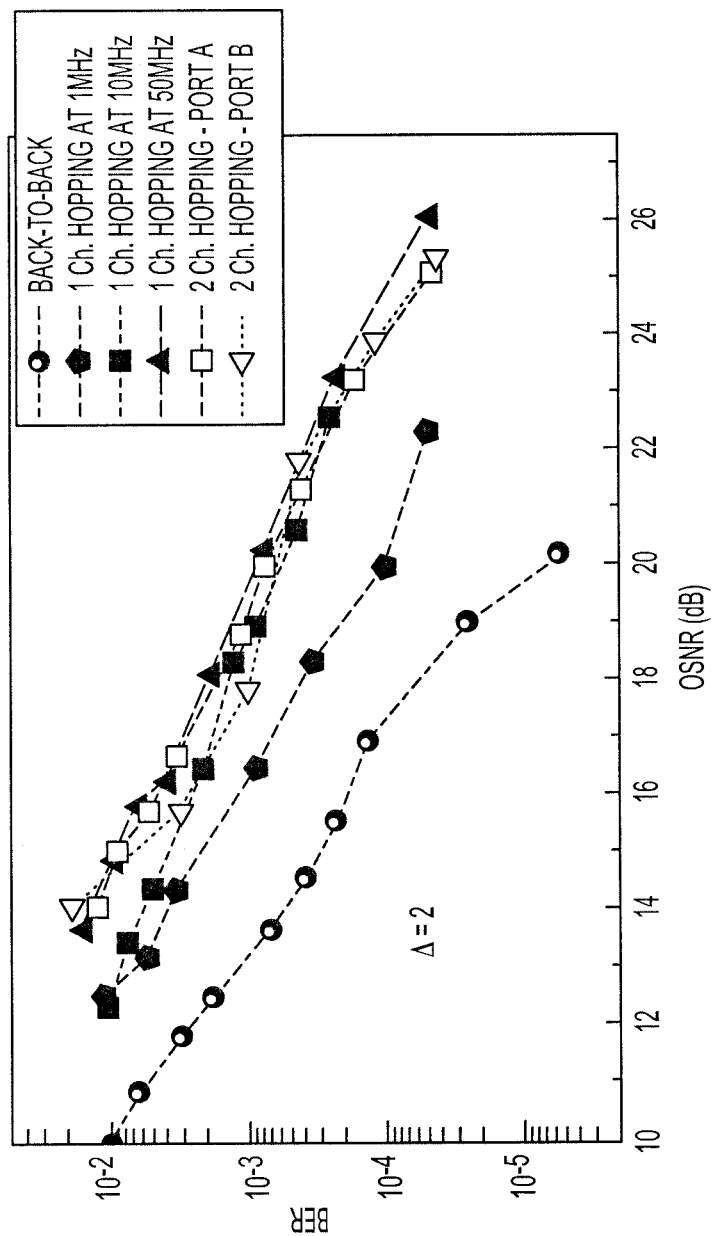
FIG. 8 shows a graphical illustration of the bit error rate when channel hopping at different rates according to an aspect of the invention.

In another example, using the same experimental setup, FIG. 7 shows the measured bit error rate as a function of the optical signal-to-noise ratio (OSNR) for the OAM value $l_3$=+1 at different mode spacing of Δ=1, 2 and 3, respectively. The measured bit error rate curves at different hopping rates of 1, 10 and 50 MHz using the mode set $\{l_1$=−3, $l_2$=−1, $l_3$=+1, and $l_4$=+3$\}$ which is shown in FIG. 8, for example.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for data encoding or channel hopping, comprising:
a signal source configured to provide a signal;
a data stream device configured to select or switch orbital angular momentum (OAM) modes when data encoding or a hopping controller configured to select or switch the OAM modes when channel hopping;
a mode converter configured to perform data encoding or channel hopping;
an optical switch coupled to the mode converter and one of the data stream device or the channel hopper, and having an input port and a plurality of output paths, the optical switch being configured to:
receive, at the input port, the signal,
route the signal to an output path of the plurality of output paths,
determine whether the signal is a continuous wave (CW) light or a data signal,
set the mode converter to perform data encoding when the signal is the continuous wave (CW) light, and
set the mode converter to perform channel hopping when the signal is the data signal;
wherein the mode converter is further configured to:
modulate the signal received from the optical switch when data encoding using a first OAM mode during a first symbol time period and using a second OAM mode during a second symbol time period, and
place bits of information on a phase and amplitude of the signal received from the optical switch when channel hopping,
using the first OAM mode during the first symbol time period and using the second OAM mode during the second symbol time period; and
a transmitter configured to propagate the signal.

2. The system of claim 1, wherein the CW light is a beam of continuous wave laser light or the data signal is a quadrature phase-shift keying (QPSK) signal.

3. The system of claim 2, wherein to provide the signal the signal source is configured to:
transmit the of CW light to the optical switch when data encoding, or
transmit the QPSK signal to the optical switch when channel hopping.

4. The system of claim 1, wherein the mode converter includes a first spatial light modulator (SLM) having a spiral phase hologram that is configured to convert or set the signal into the first OAM mode or the second OAM mode.

5. The system of claim 4, wherein the mode converter includes a beam splitter that is configured to sequence the signal from the first SLM across the first symbol time period and the second symbol time period.

6. The system of claim 5, further comprising:
a free-space collimator coupled between the optical switch and the first SLM that narrows the signal outputted from the optical switch on the output path.

7. The system of claim 1, wherein the optical switch is formed from a plurality of optical switches that are cascaded together.

8. The system of claim 1, wherein the data stream device or the hopping controller switches or selects the first OAM mode during the first symbol time period and the second OAM mode during the second symbol time period, wherein the second symbol time period is subsequent to the first symbol time period.

9. The system of claim 1, wherein to modulate the signal received from the optical switch bits of information are loaded onto the signal and the signal is converted into the first OAM mode during the first symbol time period and the second OAM mode during the second symbol time period.

10. A method for data encoding or channel hopping, comprising:
receiving, by an optical switch, a signal that is a beam of continuous wave (CW) laser light, when data encoding, or a quadrature phase-shift keying (QPSK) signal, when channel hopping;
determining, by the optical switch, whether the signal is the beam of CW laser light or the QPSK signal;
setting, by the optical switch, a mode converter to perform data encoding when the signal is the beam of CW laser light;
setting, by the optical switch, the mode converter to perform channel hopping when the signal is the QPSK signal;
routing the signal to an output path to form an orbital angular momentum mode (OAM);
selecting a first orbital angular momentum mode during a first symbol time period and a second OAM mode during a second symbol time period;
modulating, using the mode converter, the signal when data encoding;
placing, using the mode converter, bits of information on a phase and amplitude of the signal when channel hopping;
converting or setting, using the mode converter, the signal into the first OAM mode during the first symbol time period and into the second OAM mode during the second symbol time period; and
transmitting or propagating the converted or set signal.

11. The method of claim 10, further comprising:
when channel hopping, splitting the signal into at least two signals and delaying one of the at least two signals for de-correlation.

12. The method of claim 10, wherein the mode converter includes a first spatial light modulator (SLM) having a spiral phase hologram, wherein converting or setting the signal into the first OAM mode includes converting the signal onto the first OAM mode for the first symbol period using the first spatial light modulator (SLM) having the spiral phase hologram to convert or set the signal.

13. A system for data encoding or channel hopping, comprising:
a signal source for providing a signal;
a data stream device or a hopping controller;
a spatial light modulator (SLM) having a spiral phase hologram configured to perform data encoding or channel hopping;
an optical switch coupled to the SLM and one of the data stream device or the hopping controller, and configured to:
receive the signal,
determine whether the signal is a continuous wave (CW) light or a data signal, set the SLM to perform data encoding when the signal is the continuous wave (CW) light, set the SLM to perform channel hopping when the signal is the data signal, and route the signal to an output path of a plurality output paths;

wherein the SLM having the spiral phase hologram is further configured to:

modulate the signal from the optical switch when data encoding, place bits of information on a phase and amplitude of the signal received from the optical switch when channel hopping, and convert or set the signal using a first orbital angular momentum (OAM) mode during a first symbol time period and using a second OAM mode during a second symbol time period;

a beam splitter that is connected to the SLM and configured to combine signals on the plurality of output paths and propagate the combined signal over-the-air;

a receiver that is configured to receive the combined signal; and a second SLM to decouple the combined signal.

14. The system of claim 13, further comprising a processor that is configured to perform data detection and recovery from the decoupled signal.

15. The system of claim 13, wherein the data stream device is configured to select the first OAM mode during the first symbol time period and the second OAM mode during the second symbol time period from among a plurality of OAM modes for data encoding or channel hopping.

16. The system of claim 13, wherein the optical switch is formed from a plurality of optical switches that are cascaded together, wherein the signals on the plurality of output paths have different OAM modes.

17. The system of claim 13, further comprising a transmitter that is configured to propagate the combined signal to the receiver.

18. The system of claim 13, wherein converting or setting the signal using the first OAM mode during the first symbol time period and using the second OAM mode during the second symbol time period includes switching from the first OAM mode to the second OAM mode to secure transmission of the signal.

* * * * *

UNITED STATES PATENT AND TRADEMARK OFFICE
CERTIFICATE OF CORRECTION

PATENT NO. : 10,750,257 B2
APPLICATION NO. : 15/838120
DATED : August 18, 2020
INVENTOR(S) : Alan E. Willner et al.

It is certified that error appears in the above-identified patent and that said Letters Patent is hereby corrected as shown below:

In the Specification

Column 1, Line 14 please add the following paragraph before "BACKGROUND":
STATEMENT AS TO FEDERALLY SPONSORED RESEARCH
This invention was made with government support under ECCS1509965 awarded by the National Science Foundation, and N00014-16-1-2813 awarded by the Office of Naval Research. The government has certain rights in the invention.

Signed and Sealed this
Ninth Day of January, 2024

Katherine Kelly Vidal
*Director of the United States Patent and Trademark Office*